United States Patent
Westen

(10) Patent No.: US 7,164,423 B1
(45) Date of Patent: Jan. 16, 2007

(54) METHOD AND APPARATUS FOR PROVIDING AN ANIMATED REPRESENTATION OF A REORDER OPERATION

(75) Inventor: Peter T. Westen, Menlo Park, CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

(21) Appl. No.: 10/427,031

(22) Filed: Apr. 30, 2003

(51) Int. Cl.
*G06T 13/00* (2006.01)
*G06T 15/70* (2006.01)

(52) U.S. Cl. ..................... 345/473; 345/474
(58) Field of Classification Search .............. 345/473, 345/474, 475
See application file for complete search history.

(56) References Cited

U.S. PATENT DOCUMENTS

| | | | |
|---|---|---|---|
| 4,107,784 A | 8/1978 | Bemmelen | 364/900 |
| 4,433,377 A | 2/1984 | Eustis et al. | 364/200 |
| 4,485,439 A | 11/1984 | Rothstein | 364/200 |
| 4,513,379 A | 4/1985 | Wilson et al. | 364/474 |
| 4,555,775 A | 11/1985 | Pike | 395/158 |
| 4,586,158 A | 4/1986 | Brandle | 364/900 |
| 4,600,919 A * | 7/1986 | Stern | 345/473 |
| 4,642,790 A | 2/1987 | Minshull et al. | 364/900 |
| 5,261,041 A * | 11/1993 | Susman | 345/473 |
| 5,267,154 A * | 11/1993 | Takeuchi et al. | 345/473 |
| 5,325,472 A * | 6/1994 | Horiuchi et al. | 345/427 |
| 5,561,745 A * | 10/1996 | Jackson et al. | 345/419 |
| 5,592,609 A * | 1/1997 | Suzuki et al. | 345/473 |
| 5,617,539 A | 4/1997 | Ludwig et al. | 395/200.57 |
| 5,758,079 A | 5/1998 | Ludwig et al. | 395/200.34 |
| 5,854,893 A | 12/1998 | Ludwig et al. | 395/200.34 |
| 5,880,743 A * | 3/1999 | Moran et al. | 345/473 |
| 5,896,500 A | 4/1999 | Ludwig et al. | 395/200.34 |
| 5,933,549 A * | 8/1999 | Ide et al. | 382/309 |
| 6,115,053 A * | 9/2000 | Perlin | 345/475 |
| 6,184,899 B1 * | 2/2001 | Akemann | 345/473 |
| 6,191,798 B1 * | 2/2001 | Handelman et al. | 345/473 |
| 6,222,560 B1 * | 4/2001 | Naka et al. | 345/474 |
| 5,884,039 A1 | 5/2001 | Ludwig et al. | 395/200.57 |
| 6,237,025 B1 | 5/2001 | Ludwig et al. | 709/204 |
| 6,326,971 B1 * | 12/2001 | Van Wieringen | 345/474 |
| 6,351,762 B1 | 2/2002 | Ludwig et al. | 709/204 |
| 6,377,276 B1 * | 4/2002 | Ludtke | 345/620 |

(Continued)

OTHER PUBLICATIONS

Girard and Maciejewski, "Computational modeling for the computer animation of legged figures", Proc. 12th Annual Conf. on Computer Graphics and Interactive Techniques, SIGGRAPH 1985, ACM Press, NY, NY, 263-270.*

(Continued)

*Primary Examiner*—Ulka Chauhan
*Assistant Examiner*—Roberta Prendergast
(74) *Attorney, Agent, or Firm*—Williams, Morgan & Amerson, P.C.

(57) ABSTRACT

A method and an apparatus are provided for controlling a graphical user interface to display a plurality of data items in a first orientation. In the event that the GUI is subsequently requested to display the data items in a second orientation, the GUI, operating under software control, animates the required movement of the individual data items such that the individual data items are shown moving from their positions in the first orientation to their positions in the second orientation.

20 Claims, 6 Drawing Sheets

U.S. PATENT DOCUMENTS

| | | | |
|---|---|---|---|
| 6,388,669 B1 * | 5/2002 | Minami et al. | 345/474 |
| 6,414,685 B1 * | 7/2002 | Takakura et al. | 345/473 |
| 6,437,818 B1 | 8/2002 | Ludwig et al. | 348/14.09 |
| 6,594,688 B1 | 7/2003 | Ludwig et al. | 709/204 |
| 6,803,915 B1 * | 10/2004 | Takakura et al. | 345/473 |
| 2001/0005208 A1 * | 6/2001 | Minami et al. | 345/474 |

OTHER PUBLICATIONS

Si-Jung Kim et al., "Goal directed motion of 3D human characters", IEEE International Conference on Systems, Man, and Cybernetics, vol. 5, Oct. 1998, pp. 4334-4339.*

Meyrowitz, Normal; Moser, Margaret; Bruwin: *An Adaptable Design Strategy for Window Manager/Virtual Terminal Systems; Department of Computer Science, Brown University* (1981); pp. 180-189.

Scheifler, R.W.; *The X Window System; MIT Laboratory for Computer Science and Gettys, Jim Digital Equipment Corporation and MIT Project Anthena; ACM Transactions on Graphics*, vol. 5, No. 2, Apr. 1986, pp. 79-109.

Wadlow, M.G.; *The Role of Human Interface Guidelines in the Design of Multimedia Applications, Carnegie Mellon University (To be Published in Current Psychology: Research and Reviews, Summer 1990)* pp. 1-22 (CMU-ITC-91-101).

Morris, James H. et al.; *Andrew: A Distributed Personal Computing Environment; Communications of the ACM, (Mar. 1986); vol. 29 No. 3, pp. 184-201.*

Howard, John H.; *(Abstract) An Overview of the Andrew File System; Informational Technology Center, Carnegie Mellon University;* (CMU-ITC-88-062); pp. 1-6 (CMU-ITC-88-062) (To Appear in a future issue of the ACM Transactions on Computer Systems.

Borenstein, Nathaniel S.; Information Technology Center and Computer Science Department, Carnegie Mellon University; Thyberg, Chris A. Academic Computing, Carnegie Mellon University: *Cooperative Work in the Andrew Message System;* (1988) pp. 306-323.

Trowbridge, David: Center for Design of Educational Computing, Carnegie-Mellon University; *Using Andrew for Development of Educational Applications;* pp. 1-6 (CMU-ITC-85-065).

Palay, Andrew J., et al., Information Technology Center, Carnegie-Mellon University; *The Andrew Toolkit; An Overview;* pp. 1-15.

Raper, Larry K., *The C-MU PC Server Project* (Dec. 1986) pp. 1-30 (CMU-ITC-86-051).

Gruhn, A.M. and Hohl, A.C., *A Research Perspective on Computer-Assisted Office Work;* (1979) IBM Syst. J. Vol. 18, No. 3, pp. 432-456.

Bleher, J.H., et al.; *A Graphic Interactive Application Monitor; IBM Syst. J.*, vol. 19, No. 3 (1980) pp. 382-402.

Gardner, P.C.; *A System for the Automated Office Environment;* IBM Syst. J., vol. 20, No. 3, (1981) pp. 321-345.

Betts, B., et al.; *Goals and Objectives for User Interface Software; Computer Graphics*, vol. 21, No. 2, )Apr. 1987) pp. 73-78.

Conklin, Jeffrey; *A Survey of Hypertext*, MCC Software Technology Program (Dec. 1987); pp. 1-38.

Halbert, D.C. *Programming by Example; Dept. Electrical Engineering and Comp. Sciences, University of California, Berkley*, (Nov. 1984) pp. 1-76.

Walker, B., et al., *The LOCUS Distributed Operating System' ; University of California Los Angeles* (1983) pp. 49-70.

Hill, R.D.; *Some Important Features and Issues in User Interface Management System; Dynamic Graphics Project*, University of Toronto, CSRI, vol. 21, No. 2 (Apr. 1987); pp. 116-120.

Croft, W. Bruce and Lefkowitz, Lawrence S.; *Task Support In an Office System; Computer and Information Science Department, University of Massachusetts*, (1984) pp. 22-24.

Fishner, S.S. et al.; *Virtual Environment Display System; Interactive 3D Graphics*(Oct. 23-24, 1986) pp. 77-87.

Ziegler, K., Jr.; *A Distributed Information System Study; IBM Syst, J.*, vol. 18, No. 3 (1979).

Meyer, Mike; *A Shell for Modern Personal Computers; Univerisity of California;* pp. 13-19.

Trigg, R.H. and Irish, P.M.; *Hypertext Habitats: Experiences of Writers in NoteCards; Hypertext '87 Papers;* Intelligent Systems Laboratory, Xerox Palo Alto Research Center; pp. 89-108.

Donahue, James; Widom, Jennifer; *Whiteboards: A Graphical Database Tool*; ACM Transactions on Office Information Systems, vol. 4, No. 1, Jan. 1986, pp. 24-41.

Rosenberg, J. et al.; *An Overview of the Andrew Message System; Information Technology Center Carnegie-Mellon University;* (Jul. 1987); pp. 99-108.

Morland, D. Verne; *Human Factors Guidelines for Terminal Interface Design; Communications of the ACM (Jul. 1983) vol. 26, No. 7, pp. 484-494.*

Good, Michael D., et al.; *Building a User-Derived Interface; Communications of the ACM; (Oct. 1984) vol. 27, No. 10; pp. 1032-1043.*

Smith, Sidney L. and Mosier, Jane D.; *Guidelines for Designing User Interface Software; UserLab, Inc. (Aug. 1986); pp. 1-384.*

* cited by examiner

| | | |
|---|---|---|
| ● Bruce<br>● Jason<br>● Laura<br>● Mike<br>Allison<br>David<br>Matt<br>Sarah | ● Bruce<br>● Jason<br>● Mike/Laura<br>Allison<br>David<br>Matt<br>Sarah | ● Bruce<br>● Jason<br>● Mike<br>Allison<br>David<br>Matt<br>Sarah |
| FIGURE 5A | FIGURE 5B | FIGURE 5C |

| | |
|---|---|
| ● Bruce<br>● Jason<br>● Mike<br>Allison<br>David<br>Matt<br>Sarah | ● Bruce<br>● Jason<br>● Mike<br>Allison<br>David<br>Laura<br>Matt<br>Sarah |
| FIGURE 5D | FIGURE 5E |

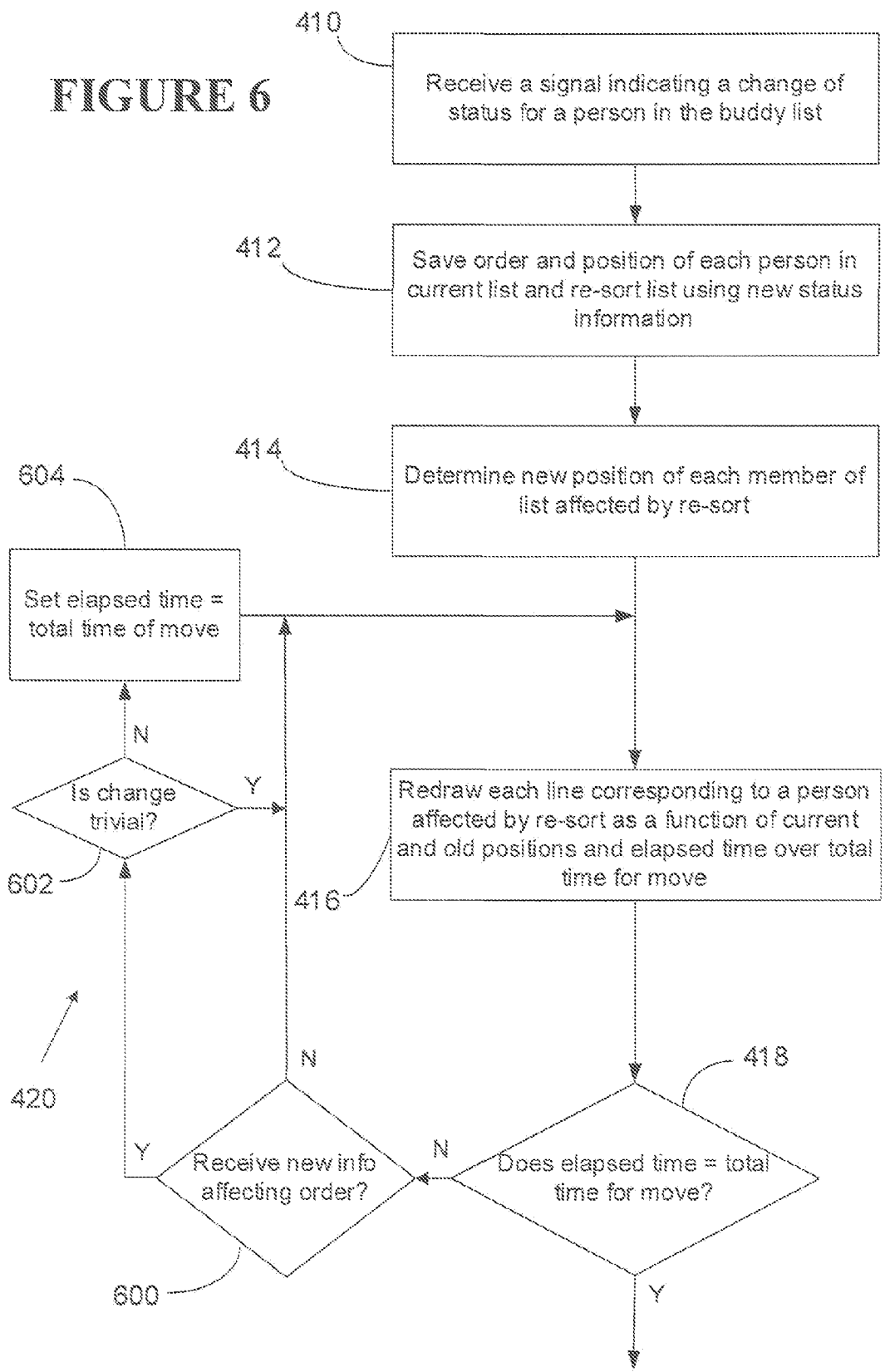

METHOD AND APPARATUS FOR PROVIDING AN ANIMATED REPRESENTATION OF A REORDER OPERATION

BACKGROUND OF THE INVENTION

1. Field of the Invention

This invention relates generally to a graphical user interface for displaying an exchange of messages during an instant messaging session, and, more particularly, to a method and apparatus for graphically communicating a reorder operation by animating movement of data items, such as user names, contained in a list.

2. Description of the Related Art

Networks, such as the World Wide Web or the Internet, intranets, or other private or public networks, are ubiquitous. In fact, many computers are connected to one or more networks at the same time. For example, a business may have hundreds or even thousands of computers coupled to its own private network, which was, at least initially, used primarily for storage and exchange of computer files. At least some of these same business computers may also be coupled to the internet. Further, with the development of wireless devices, ad hoc networks may also be formed with properly configured portable devices. Even telephonic devices, such as cellular phones, pagers and the like, may be coupled to one or more of these networks. Small businesses and homes are also often connected in similar arrangements.

All of this connectivity has naturally led to communications between various users over these networks. For example, electronic mail (e-mail), because of its usefulness, is now commonplace. E-mail is now widely used by businesses and individuals, and in at least some instances has replaced more traditional forms of communications, such as mailed letters, facsimiles, telexes, and the like. However, e-mail has proven to be somewhat awkward when used to carry on an ongoing conversation.

Instant messaging, on the other hand, allows two or more users connected through these networks to carry on an interactive conversation. Exemplary instant messaging systems include Apple iChat®, AOL Instant Messenger®, Microsoft MSN Messenger®, and the like. Typically, two or more users type in messages or select icons, which they send to one another. The receiving party(ies) may immediately respond with an appropriate message or icon. These instant messages are commonly displayed on a participant's monitor in serial fashion, such as shown in FIG. 1, usually scrolling the user's screen from top to bottom. Commonly, each message is preceded by a label, such as BobbyD211 and Fred1432 in FIG. 1, indicating the identity of the author of the message.

Each user typically maintains a listing of other people or parties with whom they routinely communicate. Various instant messaging systems use different terminology to identify these other parties, but commonly they are referred to as users, contacts, buddies or the like. An exemplary listing is shown in FIG. 2. The buddies list allows the user to initiate a conversation with a person on the list by simply selecting them from the list. Additionally, the user can readily determine which of his/her buddies are available by checking a status flag. For example, the listing can be configured so as to display the status of each buddy. Thus, when a buddy is on-line or available to receive an instant message his/her status is indicated as being on-line or available. The ordering of the buddies in the listing may be arranged by any of a number of factors. In the illustrated exemplary embodiment of FIG. 2, the buddies are arranged according to status and then alphabetically by name. In this manner, the buddies who are available (i.e., have a status of on-line or available) may be positioned in a prominent position in the list, such as at the top.

Typically, the order of the list is maintained dynamically. Thus, if the status of a buddy changes, he/she may be promoted or demoted on the list. For example, if a previously available buddy suddenly becomes unavailable (e.g., by logging off of the internet), then the list is reordered, removing the now unavailable buddy from the top of the list and placing him/her in the appropriate position further down the list. This sudden reordering of the list can be confusing, particularly since reordering of the list will often occur without any action from the local user. That is, since a remote user may log off without the knowledge of the local user, the reordering of the list may occur at a time when the local user is not monitoring the list. Thus, when the local user returns his/her attention to the list, he/she may be at least temporarily unaware of the new order. Once the change is noticed, the user may have to search the list, carefully reading each name to locate the now relocated buddy.

The present invention is directed to overcoming, or at least reducing, one or more of the problems set forth above.

SUMMARY OF THE INVENTION

In one aspect of the present invention, a method is provided. In the method, a plurality of data items are displayed in a first orientation. Thereafter, a request to arrange the plurality of data items into a second orientation is received, and movement of at least a portion of the data items between the first and second orientations is animated.

In another aspect of the present invention, a computer readable program storage device is provided and encoded with instructions that, when executed by a computer, performs a method. In the method, a plurality of data items are displayed in a first orientation. Thereafter, a request to arrange the plurality of data items into a second orientation is received, and movement of at least a portion of the data items between the first and second orientations is animated.

In still another aspect of the present invention, a graphical user interface for displaying information related to a communication session is provided. The interface is comprised of a region adapted to display a list of data items in a first orientation, and a reorder device adapted to receive information regarding the data items and determine a second orientation. A device is adapted to animate movement of at least a portion of the data items between the first and second orientations.

BRIEF DESCRIPTION OF THE DRAWINGS

The invention may be understood by reference to the following description taken in conjunction with the accompanying drawings, in which like reference numerals identify like elements, and in which:

FIGS. 5A–5E illustrate views of an exemplary screen representative of a graphical user interface during an animated reordering; and FIG. 6 illustrates a flowchart of an alternative embodiment of a graphical user interface that may be executed by components within the system of FIG. 3.

Figure 1:
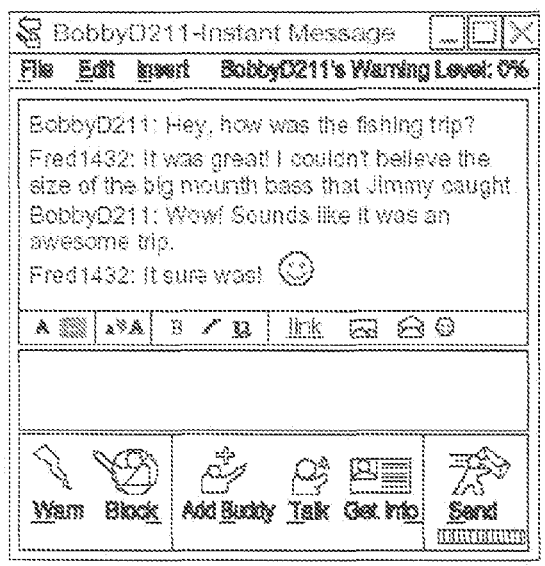
FIG. 1 illustrates a view of a screen representative of a graphical user interface showing an exchange of messages in a prior art instant messaging system.
Figure 2:
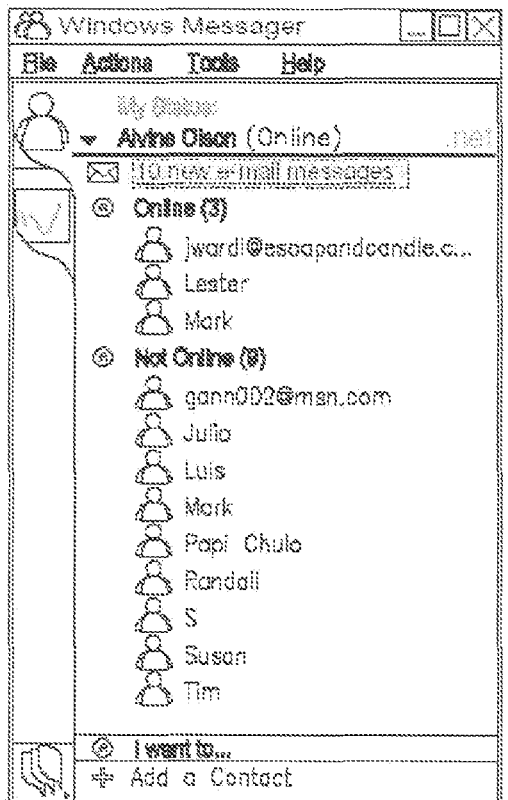
FIG. 2 illustrates a view of a screen representative of a graphical user interface showing a buddy list of a prior art instant messaging system.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 3:
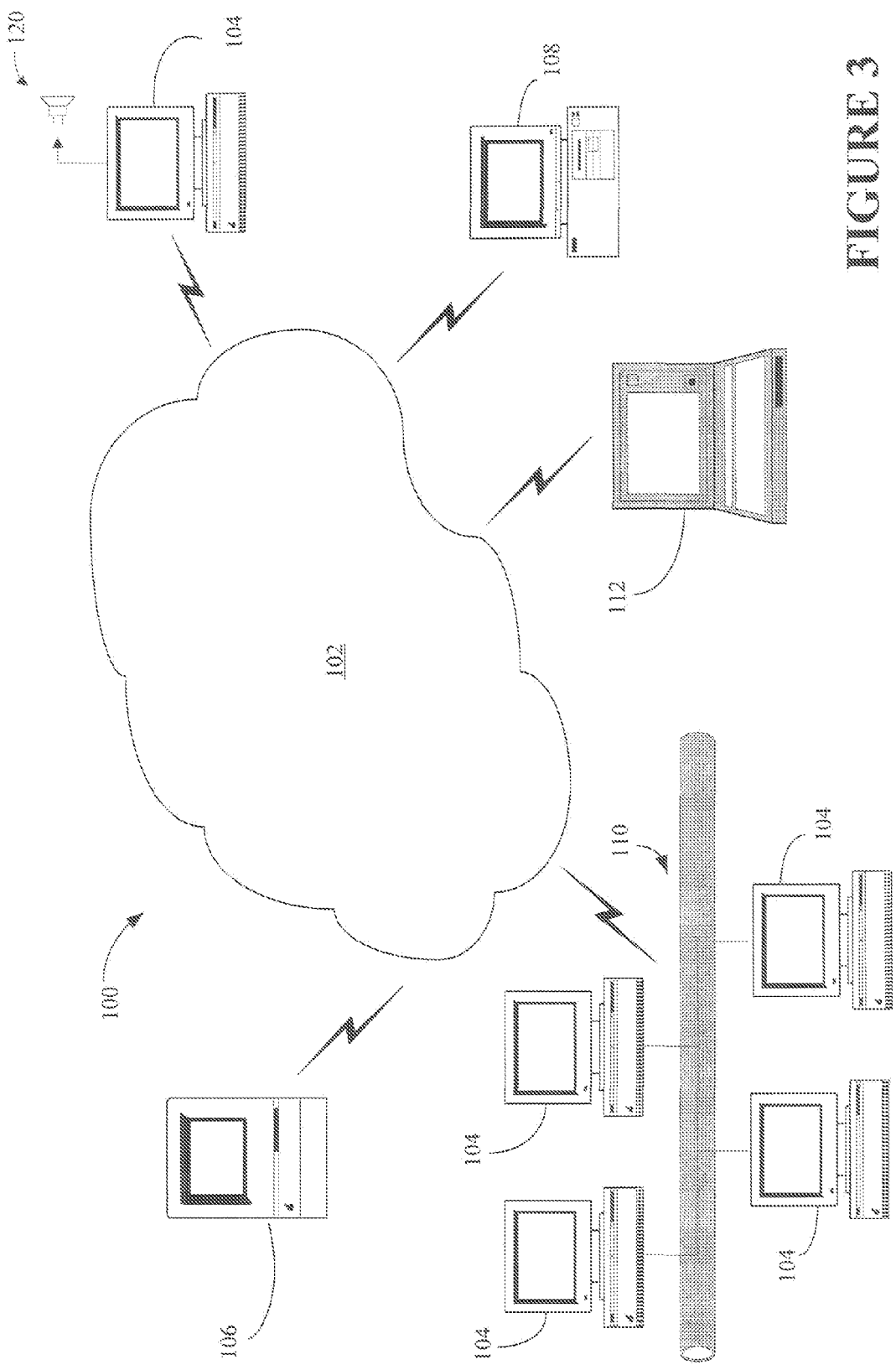
FIG. 3 illustrates a top-level diagram of one embodiment of a hardware system on which the present invention may be implemented.

Turning now to FIG. 3, a block diagram depicting a system 100 in accordance with embodiments of the present invention is illustrated. The system 100 includes a plurality of computing devices coupled together through one or more network connections. For example, a plurality of devices may be coupled together via a public or private network, such as the World Wide Web 102. The actual connection between the devices and the Web 102 may take on one or more of any of a variety of forms, such as a modem, a digital subscriber line (DSL), a cable modem, a wireless connection, and the like. The devices coupled to the Web 102 may include, for example, desktop computers, such as an Apple Macintosh® 104, a classic Apple Mac® 106, an IBM compatible personal computer (PC) 108, and the like. Further, these desktop computers, such as the Apple Macintosh® 104, may be coupled together in a local area network (LAN) 110, with the LAN 110 being coupled to the Web 102. Portable devices, such as the Apple PowerBook® or iBook® 112, may also be coupled to the Web 102, either directly or as part of the LAN 110.

Additionally, one or more of the devices may include a conventional audio system stylistically represented by the speaker 120. The audio system may be useful in presenting audible information or cues regarding the operation of various software programs on the computing devices.

Those skilled in the art will appreciate that network connections may include a variety of other equipment, such as routers, switches, telephone modems, wireless devices, cable modems, digital subscriber lines, and the like. This type of equipment is not illustrated or discussed in detail herein so as to avoid unnecessarily obfuscating the instant invention. For purposes of understanding the instant invention, it is sufficient to recognize that additional conventional equipment of this type may be useful in establishing and maintaining communications between the various users.

Figure 4A:
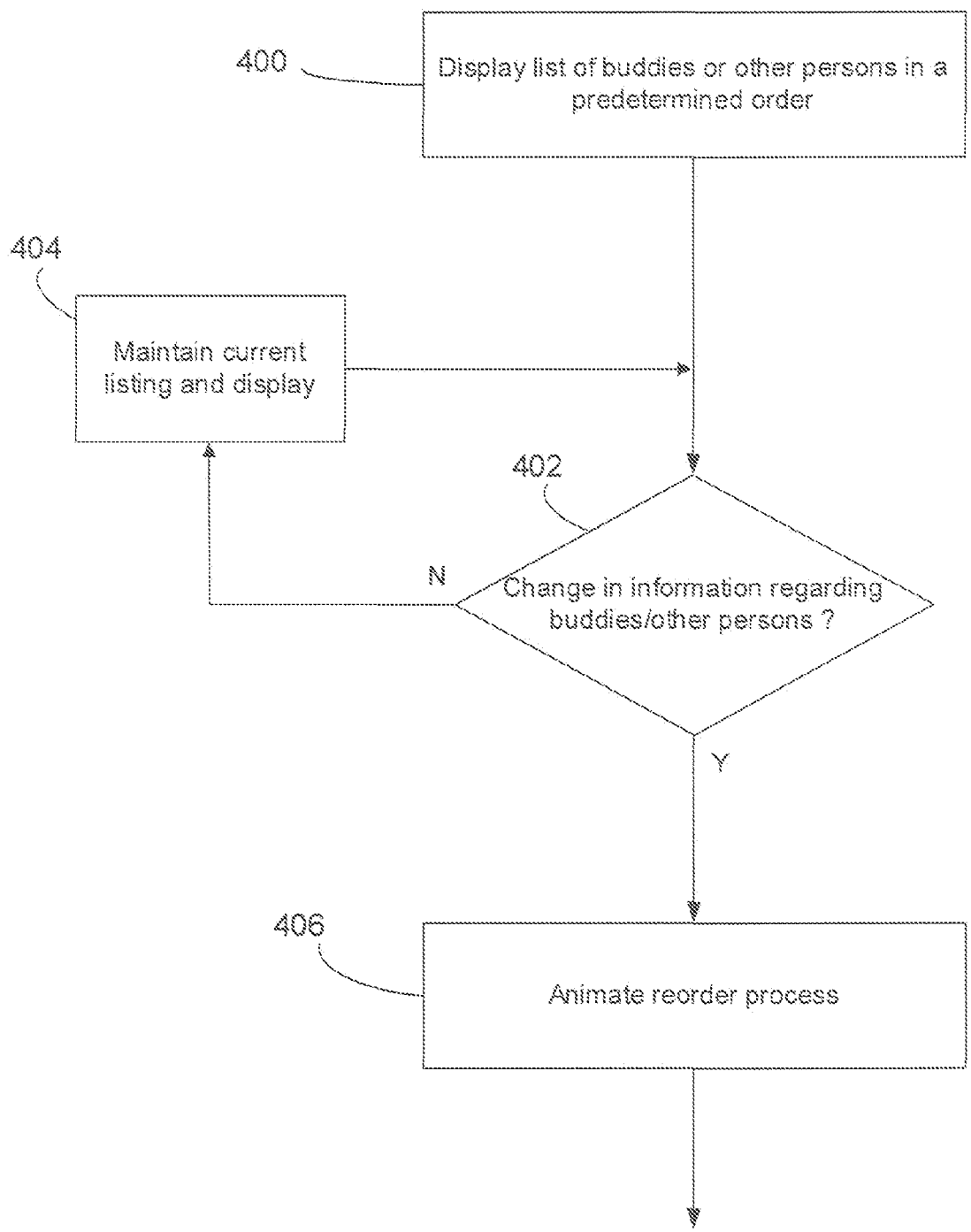
FIG. 4A illustrates a flowchart of an embodiment of a graphical user interface that may be executed by components within the system of FIG. 3 to produce the exemplary screens of FIGS. 5A–5C.

At least two of the devices in the system 100 have software, such as an application program, installed thereon to allow an instant messaging session to be initiated and conducted. FIG. 4A illustrates a top level flowchart of a portion of the software associated with controlling a graphical user interface (GUI) used by the participants to the instant messaging session. In particular, the process set forth in the flowchart of FIG. 4A describes an exemplary process that may be used to animate a reorder or re-sort operation. The process begins at block 400 with the software displaying the buddies or other persons in a predetermined order, as selected by the user through the GUI. That is, the user may elect to sort and present the users based upon any of a variety of different parameters, such as by status, alphabetically by name, by sex, etc.

At block 402 the software checks to determine if a change in information regarding the buddies has been received, and whether the change would affect the order in which they were being displayed. For example, the user may add a new buddy or other person to his list, which may necessitate a reordering of the list. Alternatively, the status of one or more of the buddies may change, such as from on-line to off-line. Additionally, the user may initiate the reorder operation by requesting that the list be sorted on a different parameter than currently represented. If no reordering is necessary, control transfers through block 404 where the current order is maintained. If, however, reordering is determined to be required, control transfers to block 406 where an animated representation of the reordering process is presented on the GUI.

Figure 4B:
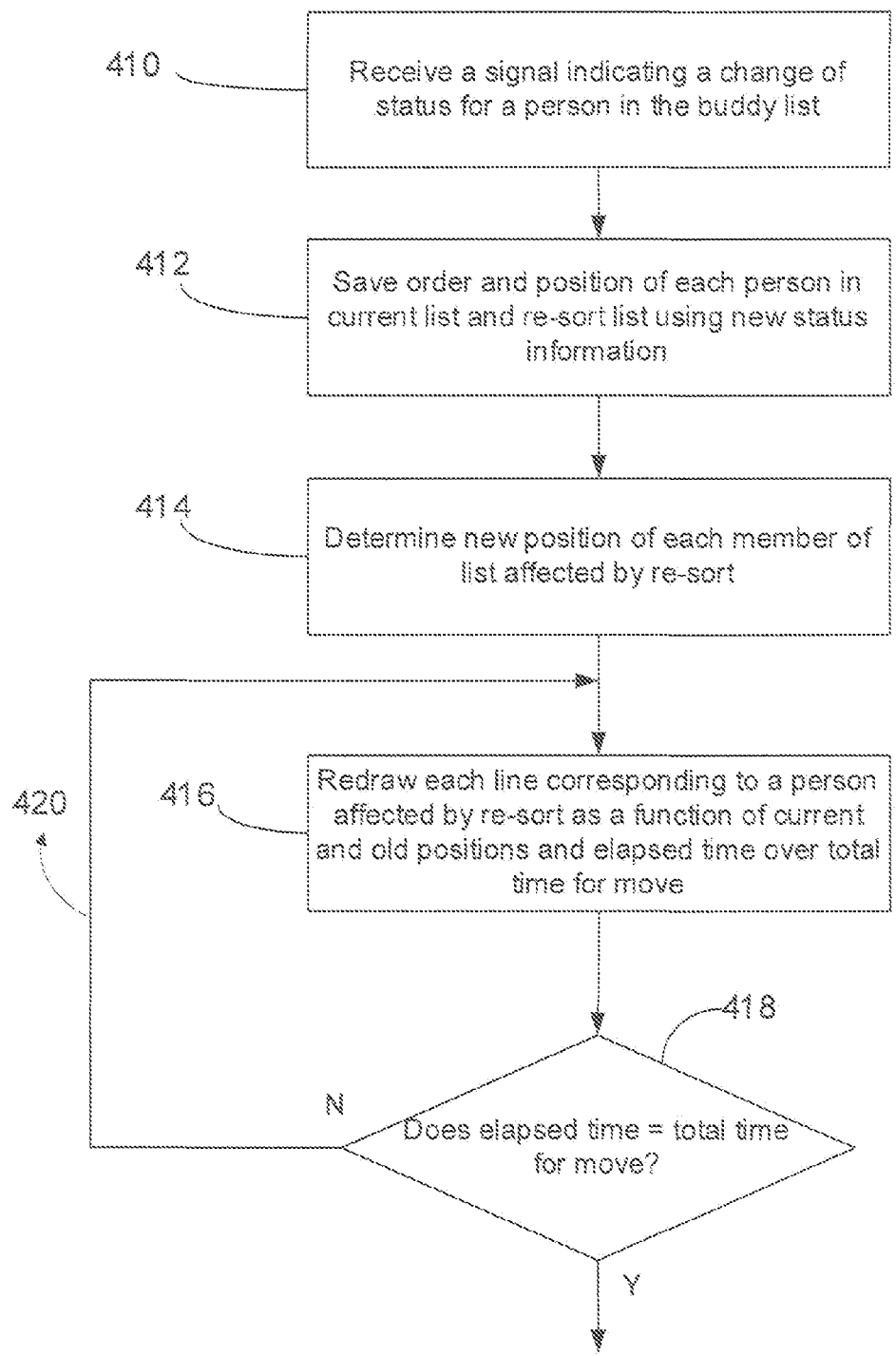
FIG. 4B illustrates an exemplary embodiment of a portion of the flowchart illustrated in FIG. 4A.

One exemplary embodiment of a more detailed description of the animated representation of the reordering or re-sorting process is shown in FIG. 4B. In the embodiment described with respect to FIG. 4B, the software is described as having received new information in the form of a change in status. Those skilled in the art will appreciate that the instant invention is not so limited, but may be useful independent of the specific event or information that initiates the re-sorting process. The exemplary embodiment described with respect to FIG. 4B is merely one example of an initiating event and the subsequent process involved in re-sorting the list.

The process begins at block 410 in a conventional manner with the software receiving a signal indicating a change, which in this exemplary embodiment is a change of status regarding at least one item contained in a data list, such as a listing of buddies. An exemplary representation of the GUI is shown in FIGS. 5A–5E and may be referenced simultaneous with the discussion of FIG. 4B herein for a more complete understanding of the operation of the instant invention. Additionally, a disk containing an animated GIF file and a QuickTime movie of an exemplary animation using principals of the instant invention is attached hereto as Appendix A.

FIG. 5A illustrates an exemplary listing of buddies arranged first by their status (i.e., Online or Not Online) and then alphabetically. At block 412, the position of each of these buddies is saved and the list is re-sorted to account for the changed status. For purposes of illustrating the principles of the instant invention, assume that the status of Laura changed from Online to Not Online and was communicated to the software at block 410. Thus, the re-sort operation will produce a listing in which Laura is moved to the Not Online status category and her position therein, by virtue of its alphabetic ordering, will be immediately after David (see FIG. 5E). The software, at block 414, uses the re-sorted listing to determine the new position of each person or buddy listed in the GUI.

Thereafter, beginning at block 416, the new, re-sorted list is drawn within the GUI, but unlike prior systems, the new re-sorted listing is not rendered immediately with its completed new ordering. Rather, the software animates the movement of each of the listings that is affected by the re-sorted new ordering. For example, FIG. 5B illustrates the GUI with the animation approximately 25% complete. That is, Laura has moved downward about halfway to her new position below David. Similarly, all of the listings from Mike to David have moved upward, creating room for Laura at her new position below David. Similarly, FIG. 5C illustrates the GUI with the animation approximately 50% complete, and FIG. 5D illustrates the GUI with the animation approximately 75% complete. At the end of the animation, the listing of persons in the GUI appears as shown in FIG. 5E with Laura in her final position below David. The software has also completed its movement of the other persons to account for the space left by Laura at her original position and to provide space for Laura at her new position. The total time required for the animation may be user programmable. In the illustrated embodiment, the default time for the animation is set to about 0.4 seconds. It should be noted that in the illustrated embodiment, the names of the various users follow a generally linear path between their initial and final position, passing in front of or behind other names in the list; however, it is anticipated that other embodiments of the instant invention may employ more circuitous paths without departing from the spirit and scope of the instant invention. For example, names moving down the list may move along an arcuate path extending toward the right side of the listing, whereas names moving up the list may move along an arcuate path extending toward the left side of the listing.

Those skilled in the art will appreciate that the resources involved in animating movement of items in the list may be reduced by limiting the number of lines rendered. In an exemplary embodiment, only the lines involved in or affected by the animation are rendered. For example, in the animation illustrated in FIGS. 5A–5E, all of the items below Jason move during the animation. Bruce and Jason, however, remain stationary and none of the moving items pass Bruce and Jason. Thus, to preserve resources, the software at block 416 recognizes that all movement occurs in lines 3–8, and, accordingly, only lines 3–8 are rendered during the animation process.

Even though a line may not be moved during the animation, it may still be involved in the animation if any of the animated lines pass by it. For example, if Bruce and Sarah were to exchange places, none of the lines from Jason to Matt would move, however, Bruce and Sarah would pass over each of the intervening lines, requiring them to be redrawn.

In the embodiment of the invention described herein all of the buddies that are moved as a result of the reordering operation have been animated. However, those skilled in the art will appreciate that in some circumstances it may be desirable to animate movement of only a portion of the buddies. For example, in the animation discussed above with respect to FIGS. 5A–5E, the main movement within the list of other persons is the movement of Laura from the Online list to the Not Online list. The movement of Mike, Allison, and David is merely incident to the movement of Laura. Thus, to reduce the resources necessary to perform the animation, it may be useful to animate the movement of Laura as discussed above, but to make the movement of the other persons on the list substantially instantaneous. Alternatively, in some instances it may be useful to vary the amount of time allotted for the movement of different listings of persons. For example, it may be useful to move the listing of a buddy who is moving a large distance at a first rate and to move the listing of a buddy who is moving only a short distance at a second, different rate. In this manner the resources dedicated to the animation may be reduced or at least reallocated. For example, by allowing movements of only a short distance to occur more rapidly or over a shorter duration of time, many of the movements will complete early within the total time required. Thus, while the initial portion of the animation may make heavy use of resources, the latter portion of the animation will require substantially less resources.

An exemplary methodology for calculating the positions of the various persons during the animation may be accomplished by a ratio of elapsed time over total time. Using this methodology, movement during the animation will have a relatively constant speed with no significant acceleration or deceleration. To give the appearance of substance or mass to the listing of persons, it may be useful to use a methodology that varies the speed of movement over the course of its path. That is, an algorithm may be designed to accelerate movement during a first period of time, hold it constant for a second period of time, and then decelerate during a final portion of the time period, thereby approximating movement of objects in the real world. For added effect, it may be useful to briefly reverse movement of the listing as it reaches its final destination so that the listing appears to bounce slightly as it reaches its final position, further enhancing a real world feel to the movement.

As represented by decision block 418, once the listing reaches its final destination, the animation process is terminated and control transfers away. A loop represented by a line 420 is intended to represent that the animation process is an iterative process with each line of moving text being re-rendered a plurality of times over the course of its movement so as to appear to move smoothly between its original and new positions. In one embodiment, the software attempts to render a moving buddy in a new position every $\frac{1}{30}^{th}$ of a second. The operating parameters of the computing device on which the software is operating; however, may limit the rate at which renderings may be accomplished. Between each rendering session, software control need not remain in the loop 420, but rather, the software may turn its attention, at least briefly, to other useful tasks.

During the course of an animation, a second re-sort operation may be requested. That is, it may be necessary to re-sort the list before the animation completes its movement of the various listings to their current position. FIG. 6 illustrates one exemplary method that may be employed in such a situation. Generally, when a new change is received, the software will terminate the current animation by substantially immediately forcing the animation to its final rendering at the final locations, and then promptly begin a new animation at block 410. In the illustrated embodiment, the flowchart of FIG. 6 differs from that of FIG. 4 principally within the loop 420. In particular, at block 600 the software checks to determine if new information affecting the order of the listings has been received. If no such information has been received, the animation continues, with control transferring to the block 416 in the same manner as discussed above with respect to FIG. 4B.

On the other hand, if new information potentially affecting the order of the listing is received, then block 600 transfers control to block 602. At block 602, the software first checks to determine if the information will cause only a trivial change, such as a change that will not result in any change to the listing currently displayed by the GUI. One example of a trivial change may occur when the listing is sufficiently large that the GUI displays only a portion of the list, and the order of that portion of the list will not vary when the new change is implemented. Another example of a trivial change is when a data item is added to or deleted from the end of an existing listing. In this instance, no "movement" of the items in the list occurs. Thus, in these instances of trivial changes, it may be useful to allow the current animation to continue. Therefore, for trivial changes, control is transferred to block 416 and the current animation is permitted to continue.

The concept of not animating trivial changes may have application to all animations, as opposed to only the secondary animations described immediately above. That is, the software may check, at blocks 400–404 for example, whether any received change may be trivial. In the event that the blocks 400–404 detect that the received change is trivial, then the animation process (represented by the blocks 416 and 418 and the loop 420 in FIG. 4A) may be bypassed so as to more efficiently utilize the resources of the computing system.

Referring again to FIG. 6, if the change is determined to be nontrivial at block 602, then control transfers to block 604 where the elapsed time is set to be equal to the total time of the move, and control is transferred to the block 416. Since the elapsed time has been artificially set to be equal to the total time of the move, the algorithm defined in block 416 will calculate that the listings should be rendered at their final positions, and block 418 detects that the animation has ended. Thus, in an exemplary situation, if one-half of the total time of the move has elapsed, then at that time the listings will be shown moved one-half of the distance to their final positions, as shown in FIG. 5C. If new, nontrivial information is received at this time, the animation will "jump" from the current position to the final position, as shown in FIG. 5E. In other words, if a second change occurs during the animation of the first change, then the first change is accelerated and animation of the second change is commenced, either in partial or complete form.

Those skilled in the art will appreciate that variations from the embodiment described above may be useful in certain circumstances. For example, in the event that a second change is received during the animation of the first change, it may be useful to accelerate the animation so that it completes more rapidly, but without completing the animation substantially instantaneously. Alternatively, it may be useful to stop the animation in its present position and then begin a new animation from the partially completed state to the new orientation dictated by the second change. For example, assume in the above described exemplary animation that Laura's status changes back to Online when the animation of her movement from Online to Not Online is only partially completed. In this circumstance, it may be useful to stop the current animation and begin a new animation that moves Laura to her "new" position on the list.

Further, the user may be made aware of the reorder operation by drawing his/her attention to the animation by an accompanying video or audio event. For example, during the animation, the user's attention may be attracted by playing an audio file through, for example, the audio system 120 (see FIG. 1), either during a portion of the animation or even during the entire event. Similarly, video events, such as flashing the GUI, changing the background colors, etc., may be used to attract the attention of the user. The audio file may take on any of a variety of forms, including but not limited to beeps, buzzes, blips, phrases, musical pieces, and the like. Further, the type of audio event may indicate the type of reordering that may be occurring. For example, when a buddy's status changes from Online to Not Online, an audio clip of a phrase, such as "good-bye" or "so long" may be played. Moreover, the name associated with the person may be "spoken" as well. Thus, if another person identified as Norma Jean changed status from Online to Not Online, the phrase "good-bye Norma Jean" could be produced. Those skilled in the art will appreciate that the audio and video events may or may not be caused or produced by the software described herein to control the operation of the GUI. That is, software associated with detecting status may be independent of the software used to control the GUI, and this separate software may actually be used to produce the audio or video event, before or even during the animation.

The instant invention has generally been described in the context of computer software. Those skilled in the art will appreciate that some or all of the functions attributed to software may be accomplished by hardware, firmware, software or a combination thereof without departing from the spirit and scope of the instant invention.

Additionally, the instant invention has been described in the context of an instant messaging application program. Those skilled in the art will appreciate that the instant invention is not so limited and admits to much wider application. That is, the instant invention may be useful in any of a variety of programs that involve a listing of data items that are at least occasionally re-sorted, including but not limited to database managers, word processors, spreadsheets, email managers, and the like. These other instances of data items being reordered may benefit from the animated display described herein.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method, comprising:
   displaying a plurality of data items in a first orientation;
   receiving a first request to arrange the plurality of data items into a second orientation; and
   animating movement of at least one of the data items between the first and second orientations, animating said movement comprises periodically displaying the data item at progressive positions along a path between the first and second orientations, and wherein the data item is promptly displayed at the second orientation in response to receiving a second request to arrange the plurality of data items into a third orientation.

2. A method, as set forth in claim 1, further comprising overriding the data item being promptly displayed at the second orientation in response to determining that animating movement of the data items between the second and third orientations is trivial.

3. A method, as set forth in claim 1, wherein periodically displaying the data item further comprises maintaining the display of data items that are not moved between the first and second orientations, and periodically rendering only the data item being moved between the first and second orientations.

4. A method, as set forth in claim 1, wherein animating movement further comprises:
   determining a current location of a data item to be animated;
   determining a target location of the data item to be animated;
   identifying a time period for the animation; and
   periodically rendering the animated data item at a location between the current and target locations as a function of an elapsed time and the identified time period.

5. A method, as set forth in claim 4, wherein periodically rendering the animated data item further comprises periodically rendering the animated data item at a location between the current and target locations as a function of an elapsed time divided by the identified time period.

6. A method, as set forth in claim 4, wherein displaying a plurality of data items in a first orientation further comprises displaying only a portion of a list of the plurality of data items, and wherein periodically rendering the animated data item further comprises periodically rendering the animated data item only when the location of the animated data item is within the portion of the list being displayed.

7. A method, as set forth in claim 1, wherein animating movement further comprises:
   determining a current location of each of a plurality of data items to be animated;
   determining a target location of each of the plurality of data items to be animated;
   identifying a time period for the animation; and
   periodically rendering each of the animated data items at a location between the current and target locations as a function of an elapsed time and the identified time period.

8. A method, as set forth in claim 7, further comprising rendering each of the animated items at the target locations in response to receiving a second request to arrange the plurality of data items into a third orientation prior to an end of the time period.

9. A method, as set forth in claim 1, wherein displaying a plurality of data items in a first orientation further comprises displaying only a portion of a list of the plurality of data items, and wherein animating movement of at least one data item between the first and second orientations further comprises animating movement of the at least one data item only when the data item is within the portion of the list being displayed.

10. A computer readable program storage device encoded with instructions that, when executed by a computer, performs a method, comprising:
    displaying a plurality of data items in a first orientation;
    receiving a first request to arrange the plurality of data items into a second orientation; and
    animating movement of at least a portion of the data items between the first and second orientations, animating movement further comprises periodically displaying the said at least portion of the data items at progressive positions along a path between the first and second orientations, wherein the said at least portion of the data items is promptly displayed at the second orientation in response to receiving a second request to arrange the plurality of data items into a third orientation.

11. A computer readable program storage device, as set forth in claim 10, further comprising overriding the said at least portion of the data items being promptly displayed at the second orientation in response to determining that animating movement of the data items between the second and third orientations is trivial.

12. A computer readable program storage device, as set forth in claim 10, wherein periodically displaying the said at least portion of the data items further comprises maintaining the display of data items that are not moved between the first and second orientations, and periodically rendering only the data item being moved between the first and second orientations.

13. A computer readable program storage device, as set forth in claim 10, wherein animating movement further comprises:
    determining a current location of a data item to be animated;
    determining a target location of the data item to be animated;
    identifying a time period for the animation; and
    periodically rendering the animated data item at a location between the current and target locations as a function of an elapsed time and the identified time period.

14. A computer readable program storage device, as set forth in claim 13, further comprising rendering the animated item at the target location in response to receiving a second request to arrange the plurality of data items into a third orientation.

15. A computer readable program storage device, as set forth in claim 13, wherein periodically rendering the animated data item further comprises periodically rendering the animated data item at a location between the current and target locations as a function of an elapsed time divided by the identified time period.

16. A computer readable program storage device, as set forth in claim 13, wherein displaying a plurality of data items in a first orientation further comprises displaying only a portion of a list of the plurality of data items, and wherein periodically rendering the animated data item further comprises periodically rendering the animated data item only when the location of the animated data item is within the portion of the list being displayed.

17. A computer readable program storage device, as set forth in claim 10, wherein animating movement further comprises:
    determining a current location of each of a plurality of data items to be animated;
    determining a target location of each of the plurality of data items to be animated;
    identifying a time period for the animation; and
    periodically rendering each of the animated data items at a location between the current and target locations as a function of an elapsed time and the identified time period.

18. A computer readable program storage device, as set forth in claim 10, wherein displaying a plurality of data items in a first orientation further comprises displaying only a portion of a list of the plurality of data items, and wherein animating movement of at least one data item between the first and second orientations further comprises animating movement of the at least one data item only when the data item is within the portion of the list being displayed.

19. A method, comprising:
    displaying a plurality of data items in a first orientation;
    receiving a first request to arrange the plurality of data items into a second orientation; and
    animating movement of at least one of the data items between the first and second orientations, wherein the data item is promptly displayed at the second orientation in response to receiving a second request to arrange the plurality of data items into a third orientation.

20. A method, as set forth in claim 19, further comprising overriding the data item being promptly displayed at the second orientation in response to determining that animating movement of the data items between the second and third orientations is trivial.

* * * * *